(12) United States Patent
Carroll, II et al.

(10) Patent No.: US 6,238,563 B1
(45) Date of Patent: May 29, 2001

(54) FILTERED SANITATION SYSTEM

(75) Inventors: Paul L. Carroll, II, Stuart; Sterling L. Carroll, Palm City, both of FL (US)

(73) Assignee: Carroll Industries, Inc., Stuart, FL (US)

( * ) Notice: Subject to any disclaimer, the term of this patent is extended or adjusted under 35 U.S.C. 154(b) by 0 days.

(21) Appl. No.: 09/539,939

(22) Filed: Mar. 31, 2000

Related U.S. Application Data

(63) Continuation-in-part of application No. 09/304,663, filed on May 4, 1999, now abandoned.

(51) Int. Cl.[7] .................................................. C02F 3/04
(52) U.S. Cl. .................... 210/605; 210/617; 210/747; 210/151; 210/170; 210/196; 210/299; 210/532.2; 210/253
(58) Field of Search .................................. 210/605, 617, 210/747, 151, 170, 196, 299, 532.2, 150, 195.1, 258, 259, 253

(56) References Cited

U.S. PATENT DOCUMENTS

| | | | |
|---|---|---|---|
| 3,494,463 | * | 2/1970 | Vermette ............................... 210/151 |
| 4,011,162 | * | 3/1977 | Oldham et al. ....................... 210/151 |
| 4,895,645 | * | 1/1990 | Zorich, Jr. ............................. 210/150 |
| 4,925,552 | * | 5/1990 | Pateson et al. ....................... 210/150 |
| 5,609,754 | * | 3/1997 | Stuth .................................. 210/532.2 |
| 5,620,602 | * | 4/1997 | Stuth .................................. 210/532.2 |

* cited by examiner

*Primary Examiner*—Christopher Upton
(74) *Attorney, Agent, or Firm*—Robert M. Schwartz; Gerald R. Hibnick

(57) ABSTRACT

Effluent from a septic tank is trickled through a first filter canister. The thus filtered effluent is recycled a plurality of times through the same filter canister, further to cleanse the effluent. A small portion of the recycling effluent is directed outward into a drip irrigation system. A second filter canister, not in line with the first canister, also receives some of the recycling, filtered effluent, for plural recycles therethrough, to enhance the filtering process, at the same time that other of the filtered effluent is being recycled through the first filter canister. The filtered effluent from the two canisters are permitted to combine prior to subsequent recycling.

14 Claims, 2 Drawing Sheets

FILTERED SANITATION SYSTEM

CROSS REFERENCE TO RELATED APPLICATION

This application is a Continuation-In-Part to application Ser. No. 09/304,663, filed May 4, 1999, now abandoned.

INCORPORATED BY REFERENCE

Incorporated by reference herein is U.S. Pat. No. 5,547,589.

TECHNICAL FIELD

This invention relates to a filtered sanitation system using a septic tank and a drain field.

BACKGROUND OF THE INVENTION

As discussed in U.S. Pat. No. 5,547,589, in conventional sanitation systems using a septic tank, waste water from a home empties into the septic tank, solids accumulate and decompose on the bottom of the tank and an effluent flows from the top of the tank into a drain field. The drain field, located a few feet below ground level, is intended to diffuse the effluent into the soil, where suspended solids are filtered out and natural bacterial matter in the soils consumes the solids and other organisms as the effluent slowly leaches through the soil eventually reaching the ground water in a purified state. The typical drain field comprises of an effluent dispersal system of inclined conduits with holes at the bottom facing a stone bed, the stone providing a flow path to the surrounding soil from the holes and preventing the soil from filling the holes.

But drainfields can become contaminated over time. Even new drain fields can exhibit the problems of contaminated fields if the water table is too high, or the soil is too compacted or otherwise has poor filtering and leaching qualities. In fact, the reality is that a drain field begins to deteriorate from the moment it is covered up. After that, proper performance is "assumed", but many factors not only shorten the useful life of drain field but reduce its ability to purify the effluent. The soil characteristics can change or might not be consistent. The water table may rise. Roots from trees interfere with the leaching action. Substances in the effluent can interfere with bacterial action in the soil and speed the growth to the biomat that eventually seals off the top of the field. (Biomat is the slimy biological material that accumulates at the soil interface.)

For the homeowner, the essential problem, when a drain field is contaminated, is that the effluent is not absorbed and backs up to the septic tank. For the environment, it means that the effluent is not being cleansed completely. When a drain field is clogged, the repair is drastic, complicated and expensive. The entire field must be dug up and a new trench of several hundred square feet minimum made. Often, trees and shrubbery have to removed. Drainfield repair assumes that there is adequate land to install a new drain field and that soil qualities provide adequate absorption. Smaller plots can make it extremely difficult to layout drainfields, with the separation to ground water mandated by local ordinances. If the ground water level is too high or the soil qualities are poor, the leach field may have to be elevated when a system is repaired or, in a new home, large volumes of top soil will be needed to achieve required ground water separation and drain field elevations.

Topographical conditions and new, more stringent governmental regulations can make it impossible to install an effective new drain field. Septic systems are used only where building plots are relatively large; that is, there is enough square footage to have the required drain field area for the expected effluent outflow from the home and maintain proper spacing between the drain field and a domestic water well. The alternative sewer systems are expensive to install and, generally speaking, do not return water in the effluent back to the surrounding environment. In any case, many suburban communities have no access to sewer systems. From an environment perspective a septic system makes sense, because water consumed by a household is recycled. A typical home can consume a considerable amount of water each day, all of it ultimately entering the drainfield, where most of it ideally eventually enters the water table, far below, filtered by the soil as it leaches down.

SUMMARY OF THE INVENTION

An object of the present invention is to provide a superior septic sanitation system, so that a leach field is not required, with conceivably indefinite useful life and only occasional service; and the performance is unaffected by the surrounding conditions.

According to the invention, a trickle filter is installed in a water tight container that is placed in the ground. Effluent from the septic tank trickles through from the top of a trickle filter and collects in the bottom of the container. A pump recirculates the filtered effluent back to the top of the trickle filter and also directs a small amount of the filtered and refiltered effluent into an irrigation system with a drip line.

According to a preferred embodiment of the invention, one or more filter canisters with replaceable filter media are placed in a water tight container. The container is installed below ground. Its top is roughly flush with the ground surface, with an access port in a container lid that is bolted and sealed in place on the top of the container forming a water tight compartment housing the filter canisters. Effluent from a septic tank flows into the container at a point above one of the filter canisters and the effluent showers down on the filter media. As this effluent trickles through the canister, it is filtered. Particulate matter is trapped and organic matter is consumed. The thus cleansed/purified effluent collects in the bottom of the container, below the lowest point of the media, so that the media is not saturated by the cleansed effluent. A sump pump, located in a pump chamber inside the container, pumps the effluent from the bottom of the container through a pipe, when the effluent reaches a specified height. Some of this pumped effluent is reapplied to the first filter canister and also to a second adjacent filter canister, which can be stocked with different filter media. The pumped effluent is further cleansed by this repeated filtration through both of the canisters and collects at the bottom of the container. The line from the pump also contains a venturi to introduce aeration into the effluent flow.

DESCRIPTION OF THE PREFERRED EMBODIMENTS

Figure 1:
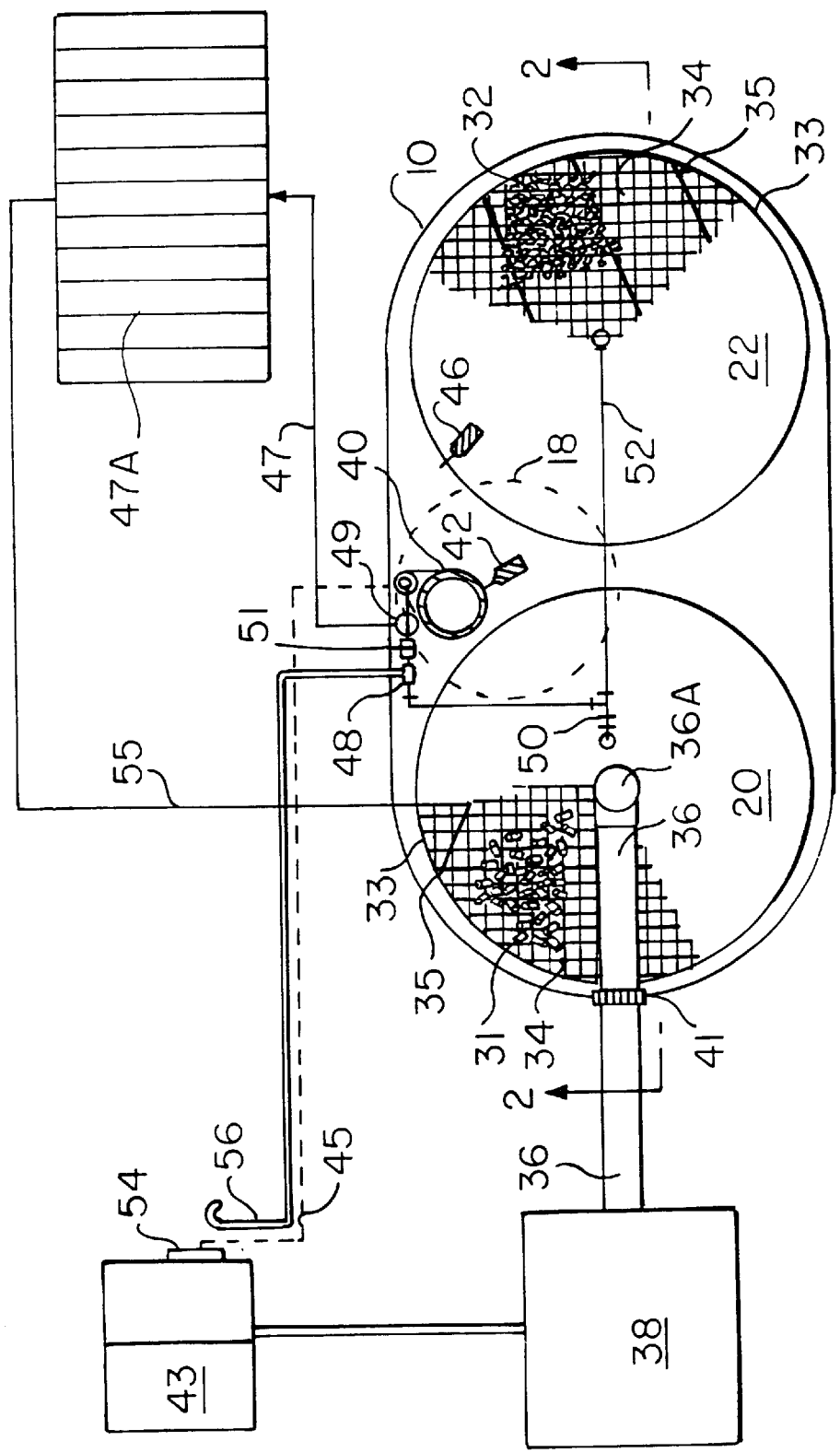
FIG. 1 is a plan view of a home sanitation system embodying the invention.
Figure 2:
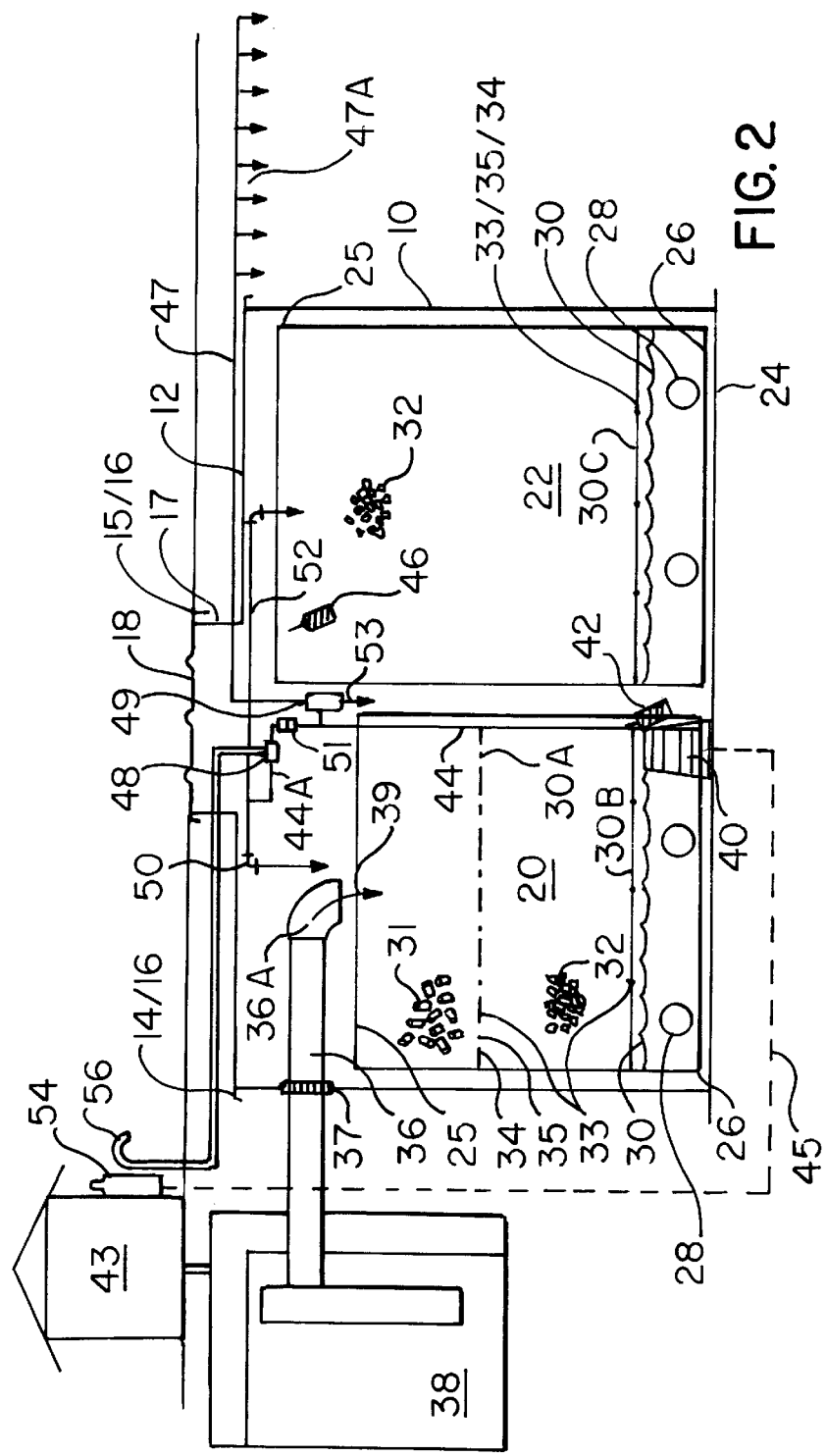
FIG. 2 is a section along line A—A in FIG. 1.

The present invention connects with any septic tank, such as the one in the above identified U.S. Pat. No. 5,547,589, incorporated herein by reference. Referring to FIGS. 1 and 2, the system uses a water tight container 10, that has a removable cover plate 12. The container can be molded from chopped glass, a mixture of chopped fiberglass and resin that is sprayed over a mold. The cover 12 may also be chopped glass sandwiching a core material, such as a rigid insulation material used on building roofs and walls, or a closed cell foam material, such as Airex brand foam. The cover 12 is bolted along a flange 14 with fasteners 16, with a sealing gasket (not shown) between the flange and the cover 12, for water tightness. The cover contains an elevated access port 17, with a removable access cover 18. The container 10 is buried in the ground, as shown in FIG. 2, with the cover 18 accessible at the surface for servicing operations.

Two filter canisters 20, 22 rest on the bottom 24 of the container 10. The canisters are cylindrical, generally open at their tops 25 and closed at their bottoms 26. The canisters can rest on legs or standoffs above the the bottom 24, creating a void for fluid accumulation below; or drain holes 28 are cut in the walls, just above the bottom 26, so that fluid 30 in the canisters flows into the void, where it mixes with previously filtered effluent. One of these canisters 20 is called an "influent" filter, a term connoting the fact that this filter first receives the effluent. Another canister 22 is the "treatment canister", which only receives the container contents that has been filtered by the influent filter. Each canister 20,22 contains filter sections, for example 30a–c, each containing filter media 31, 32 in a circular tray 33 with screen material 34 bottoms, supported on cross pieces 35.

Media 31, the top media in the cannister 20, can comprise so-call "bio-barrels". These are light plastic, hollow objects on which organic matter quickly grows. They also provide large particle filtration. The other filter media 32 is lava rock, a comparatively light material that rapidly dries, which can be the bottom media in canister 20 and also fills canister 32.

An effluent supply pipe 36 extends through an o-ring seal 37 in the wall of the container 10 from a septic tank 38, connected to a home 43. An elbow 36a directs effluent (arrow 39) to the top of the filter canister 20. The effluent trickles or splatters down on to the media 31 for filtering and pre-treating the effluent 39. A submersible pump 40 rests on the bottom 24 of the container 10. The pump 40 is accessible through the cover 18, which also makes it possible to inspect the canisters and the recirculation components, which are explained below. The pump 40 receives power from the home via an electrical conduit 45. A float switch 42 turns on the pump when the level of the fluid 30 rises sufficiently. The height of this fluid 30 is kept below the bottom of the filter media 31, 32 so that they drain completely. A kill float switch 46 is located above the media 32 in the treatment canister 22. It prevents pump activation if fluid accumulates due to media "blinding". It also provides a warning, via an alarm box 54 coupled to the electric line 45, that the level in the container is too high, which would happen if the pump 40 failed.

The pump output is supplied over a pipe 44, which extends to the top of the container 10. A drip irrigation line 47 with drip components 47a, one type made by Geoflow, Inc, Charlotte, N.C., connects with the output pipe 44. The drip irrigation line is buried below the surface by about six inches. Interposed between the output pipe 44 and the irrigation line 47 is a strainer 49 having a flush valve 53. The output pipe 44 has a leg 44a, in which are a venturi 48 and an orifice plate 51. The pipe leg 44a connects to recycle pipes 50 and 52, which overlie the tops of the canisters 20 and 22, respectively. The flush valve 53 is kept partially open to enable continual cleaning of the strainer 49. The orifice plate 51 maintains pressure to the strainer 49, the drip irrigation system 47 and 47a, and a drip irrigation return line 55. The irrigation return line enables continual flushing of the drip irrigation system. The venturi 48 inducts air into pipe leg 44a and supplies air to the fluid flow in those pipes. A small flexible tube 56 extends back to the house 43. The air in the recycle pipes causes desirable aeration to the recycling effluent and agitation to the filter media in the canisters.

In filter operation, the effluent 39 trickles down the influent cannister 20, is filtered and cleaned in the process and eventually causes the fluid 30 level to rise, so that the pump 40 turns on by the float switch 42. Some of the fluid 30 is thereby pumped up pipe line 44, through the strainer 49 to the drip line 47. But most of the recycling flow goes into the pipe leg 44a then to the recycle pipes 50, 52 and back to the influent cannister again, some of the filtered effluent going treatment cannister 22. That is, as the effluent is recycled many times through the filters in canisters 20, 22, the fluid 30 level slowly drops and the pump 40 eventually turn off, until more effluent comes into the container 10 from the septic tank 38.

It can be appreciated that recycling process repeatedly cleans the effluent, for example from ten to twenty times before it is discharged from the canisters to the drip irrigation line 47. Also, it has been found that, over time, organic growth takes place on the media.

Figure 3:
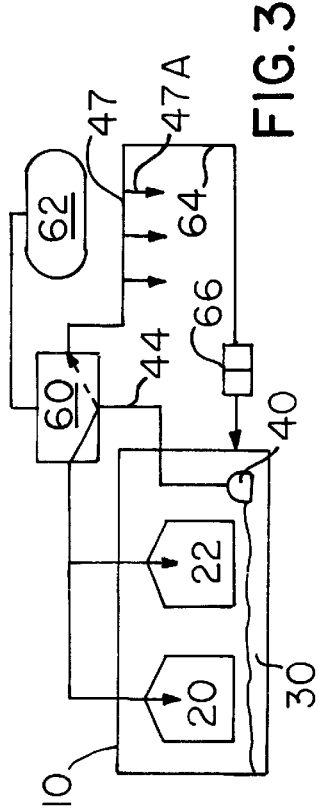
FIG. 3 is block diagram showing the use of a timer controlled valve to select between recirculation and irrigation modes.

A modification of the invention, shown in FIG. 3, involves using a valve 60 to switch between the recycling mode, when the effluent is applied continuously to the filters in canisters 20 and 22; and the discharge mode, when the filtered fluid 30 is fed through the drip line 47. The selection between the two modes can be controlled by a timer 62, so that the pump 40 runs in the recycle mode for a desired duration and, alternately, when fluid 30 is discharged through to the drip line 47. The drip line 47 can extend in a loop 64, having an orifice plate 66, back to the bottom of the container 10 to maintain adequate pressure in the drip line and allow some return flow to remove residual matter from the drip line.

One skilled in the art will be able to make changes and modify the invention, its components and functions without departing from the true scope and spirit of the invention, as defined by the appended claims.

What is claimed is:

1. Filtering means, for use in a sanitation system having a septic tank, said filtering means comprising; at least a first filter canister housed within a watertight container, said first filter canister arranged to receive effluent from the septic tank and accomplish filtering of the effluent as it passes through said canister, by virtue of gravity, and collects in said container;

a second gravity fed filter canister housed within said container, with both said canisters being approximately at the same water level; and recirculation means constructed and arranged with respect to said container and said first filter canister to recirculate the filtered effluent from said container back into said first filter canister for further filtration;

said recirculation means further constructed and arranged with respect to said container and said second filter canister to recirculate the filtered effluent from said container through said filter canister for yet further filtration.

2. Filtering means according to claim 1 in which:

said first filter canister contains at least one filter media which is reusable and is located in said first filter canister above a level at which the effluent collects in said container.

3. Filtering means according to claim 1 in which:

said recirculation means is constructed and arranged to direct a small portion of the filtered effluent away from said container and said first filter canister.

4. Filtering means according to claim 3 in which:

said recirculation means is constructed and arranged to direct a small volume of the filtered effluent away from said container and said first and second filter canisters.

5. Filtering means according to claim 4 further comprising:

drip irrigation means coupled to said recirculation means to receive said small volume of filtered effluent.

6. Filtering means according to claim 5 further comprising:

pressure generating means coupled to said recirculating means for flushing said drip irrigation means.

7. Filtering means according to claim 1 further comprising:

aeration means coupled to said recirculation means for introducing air agitation into the recirculating effluent.

8. Filtering means according to claim 1 in which:

said second filter canister is positioned with respect to said first filter canister such that the filtered effluent from said first filter canister can be received by said second filter canister only by means of said recirculation means.

9. A filtering method for use in a sanitation system obtaining effluent from a septic tank, said filtering method comprising the steps of:

a) receiving the effluent into a first filtering canister for gravitational filtering therethrough;

b) capturing the filtered effluent in a container;

c) recirculating the filtered effluent from the container back into the first filtering canister;

d) increasing the extent of filtering by passing some of the filtered effluent through the first filtering canister at least once again;

e) feeding a portion of the filtered effluent into a second gravitational filtering canister as part of said step of recirculating; and f) positioning both said canisters generally side by side at generally the same water level in the container.

10. The filtering method according to claim 9 and:

accomplishing said step of feeding by other than gravitation in said step of recirculating.

11. The filtering method according to claim 9 further comprising the step of:

diverting a small portion of the filtered effluent into drip irrigation means.

12. The filtering method according to claim 11 further comprising the step of:

pressurizing said step of recirculating for flushing the drip irrigation means.

13. The filtering method according to claim 11 comprising the further step of:

controlling the time duration of said step of diverting.

14. The filtering method according to claim 9 comprising the further step of:

aerating the filtered effluent during said step of recirculating.

* * * * *